United States Patent [19]

Takeuchi

[11] Patent Number: 4,731,678

[45] Date of Patent: Mar. 15, 1988

[54] DIGITAL DATA RECORDING AND REPRODUCING METHOD

[75] Inventor: Kousou Takeuchi, Osaka, Japan

[73] Assignee: Matsushita Electric Industrial Co., Ltd., Kadoma, Japan

[21] Appl. No.: 832,774

[22] Filed: Feb. 25, 1986

[30] Foreign Application Priority Data

Feb. 25, 1985 [JP] Japan .................................. 60-35759
May 16, 1985 [JP] Japan ................................ 60-104229

[51] Int. Cl.$^4$ .............................................. G11B 5/09
[52] U.S. Cl. .................................................... 360/40
[58] Field of Search ............ 360/40, 51; 340/347 DD; 375/19, 34

*Primary Examiner*—Vincent P. Canney
*Attorney, Agent, or Firm*—Cushman, Darby & Cushman

[57] ABSTRACT

A digital data recording and reproducing method in which a digital data sequence is divided into 8-bit digital data sequences. When the divided 8-bit digital data sequences are encoded into 14-bit code, an 8-bit digital data sequence wherein the value of its DSV (digital sum variation) is limited to a predetermined range is selected from two codes which are assigned to correspond to the 8-bit digital data sequence. In the encoding process, the number of "0" bits which are inserted between two "1" bits in the code sequence is restricted to a number of from one to eight so that the DC component in the code sequence can be eliminated. A bit sequence which never arises in two successive 14-bit code words may then be used as a frame synchronizing signal.

8 Claims, 16 Drawing Figures

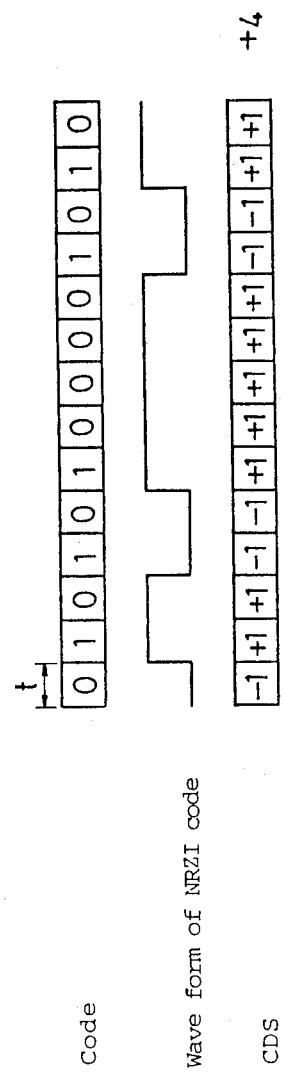
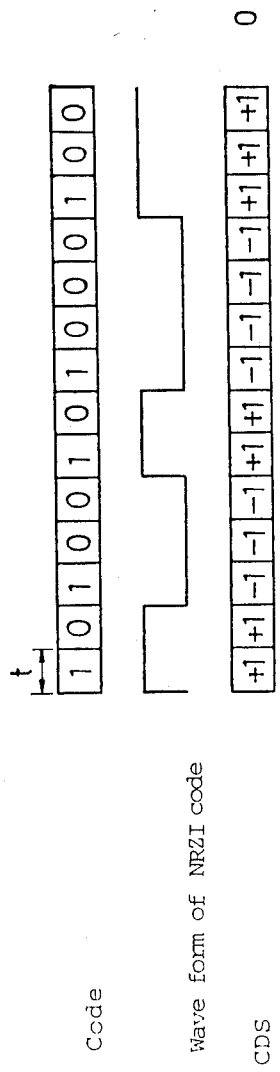

DIGITAL DATA RECORDING AND REPRODUCING METHOD

FIELD OF THE INVENTION AND RELATED ART STATEMENT

1. Field of the Invention

The present invention relates generally to a digital data processing method, and more particularly, to a new and improved method for encoding and reproducing binary digital data and for recording a synchronizing signal thereof.

2. Description of the Related Art

When digital data are recorded on a magnetic tape or are reproduced therefrom by using a rotary magnetic head, encoded binary signals corresponding to the digital data are generally transmitted to the rotary magnetic head through a rotary transformer. If the encoded binary signals contain a DC component, however, these signals are not normally recorded on the magnetic tape since the rotary transformer does not transmit the DC component.

A prior art device for eliminating the DC component of the encoded binary signals is shown in U.S. Pat. No. 4,216,460. In this patent, the 8-bit word is transformed into a 10-bit code word; however, the density ratio is smaller than 1, the density ratio being defined as: Density ratio=Tmin/T, where T is the cyclic time of the data bit and Tmin is the minimum magnetization reversal interval.

In other prior art, such as U.S. Pat. No. 4,323,931, a three position modulation method, which is a high density modulation method, is disclosed. The density ratio of this method is greater than 1, but the DC component in the encoded binary signal is not eliminated.

In the conventional digital data recording method, the digital data sequence is divided into predetermined data units. A frame synchronizing signal and an error detection code are added to each data unit, thereby forming a frame of data. The frame with the frame synchronizing signal and the error detecting code is encoded and recorded on a recording medium. During the reproducing process, the frame synchronizing signal is detected from the reproduced code sequence. The detected frame synchronizing signals are used for synchronization of clock signals and for control of the starting point, whereby the respective units of the digital data are distinguished from each other. As mentioned above, since the frame synchronizing signal has an important function, it must be surely detected.

Thus, in the prior art a method must be selected from the many kinds of methods for avoiding misdetection of the frame synchronizing signal when the position of a bit is shifted to an abnormal position. A special bit sequence, for example, a bit sequence with a long magnetization reversal interval, is thus frequently adopted. However, the plural bit sequence may exist in the code sequence and there is thus a fear of misdetection of the frame synchronizing signal. In order to avoid the above-mentioned misdetection, a protection circuit for the synchronizing signal which cyclically issues the frame synchronizing signal is necessary. Nevertheless, there is a defect in such a circuit in that when the frame synchronizing signals of continuous data units are not detected due to dropout of the recording medium, a comparatively long time is required for resumption of the certain detection of the frame synchronizing signals. Therefore, it is required to select the most suitable protection circuit system for the synchronizing signal in accordance with the function of the recording and reproducing apparatus. These circuits are generally formed by complex circuits; hence, a careful design of the system is required.

OBJECT AND SUMMARY OF THE INVENTION

An object of the present invention is to provide a digital encoding method having a high density ratio for magnetic recording wherein the DC component of a code sequence is small and a magnetization reversal interval is minimized.

Another object of the present invention is to provide a digital encoding method wherein a digital data sequence is cut into equal predetermined sections of digital data and a frame synchronizing signal and an error detecting code may be added to each digital data unit. As a result, when the digital data is reproduced, misdetection of the frame synchronizing signal decreases. In this specification, the high level and the low level of the encoded signal are shown by representations of "1" and "0", respectively.

In order to realize the first object, the digital data sequence is divided into 8-bit digital data, and every 8-bit digital data sequence is encoded into 14-bit NRZI (nonreturn-to-zero inverted)) codes, wherein when this 8-bit digital data is encoded, the number of bits of value "0" which are inserted between two bits of value "1" are restricted to less than or equal to eight bits.

In order to realize the second object, the 8-bit digital data is encoded into a 14-bit NRZI code sequence, an optionally selected successive 16-bit code is taken out from the 14-bit code sequence, and the 16-bit code is made so that it does not coincide with an N bit code sequence (N>16) including a bit sequence "1000000010000000". The N bit code sequence is then recorded as a frame synchronizing signal on a recording medium.

The digital data recording and reproducing method in accordance with the present invention thus comprises:

dividing inputted digital data into 8-bit digital data words, selecting one of two codes wherein an absolute value of the digital sum variation of the NRZI coded input waveform in which a code sequence of the digital data is encoded to NRZI code decreases, the selected code being selected such that the number of "0" bits inserted between two "1" bits in a code sequence is restricted to a number from one to eight when the 8-bit digital data is allotted to one or two codes, producing NRZI coding of a code sequence in which an 8-bit digital data word is sequentially coded, issuing a control signal which selects a 14-bit code wherein an absolute value of the digital sum variation of a waveform of the NRZI code decreases, and issuing a 14-bit code corresponding to the 8-bit digital data word by inputting the control signal.

BRIEF DESCRIPTION OF THE DRAWINGS

FIG. 11(a) and FIG. 11(b) are timing charts showing an operation of the CDS (code word digital sum) in the embodiment in accordance with the present invention.

DESCRIPTION OF THE PREFERRED EMBODIMENTS

Figure 1:
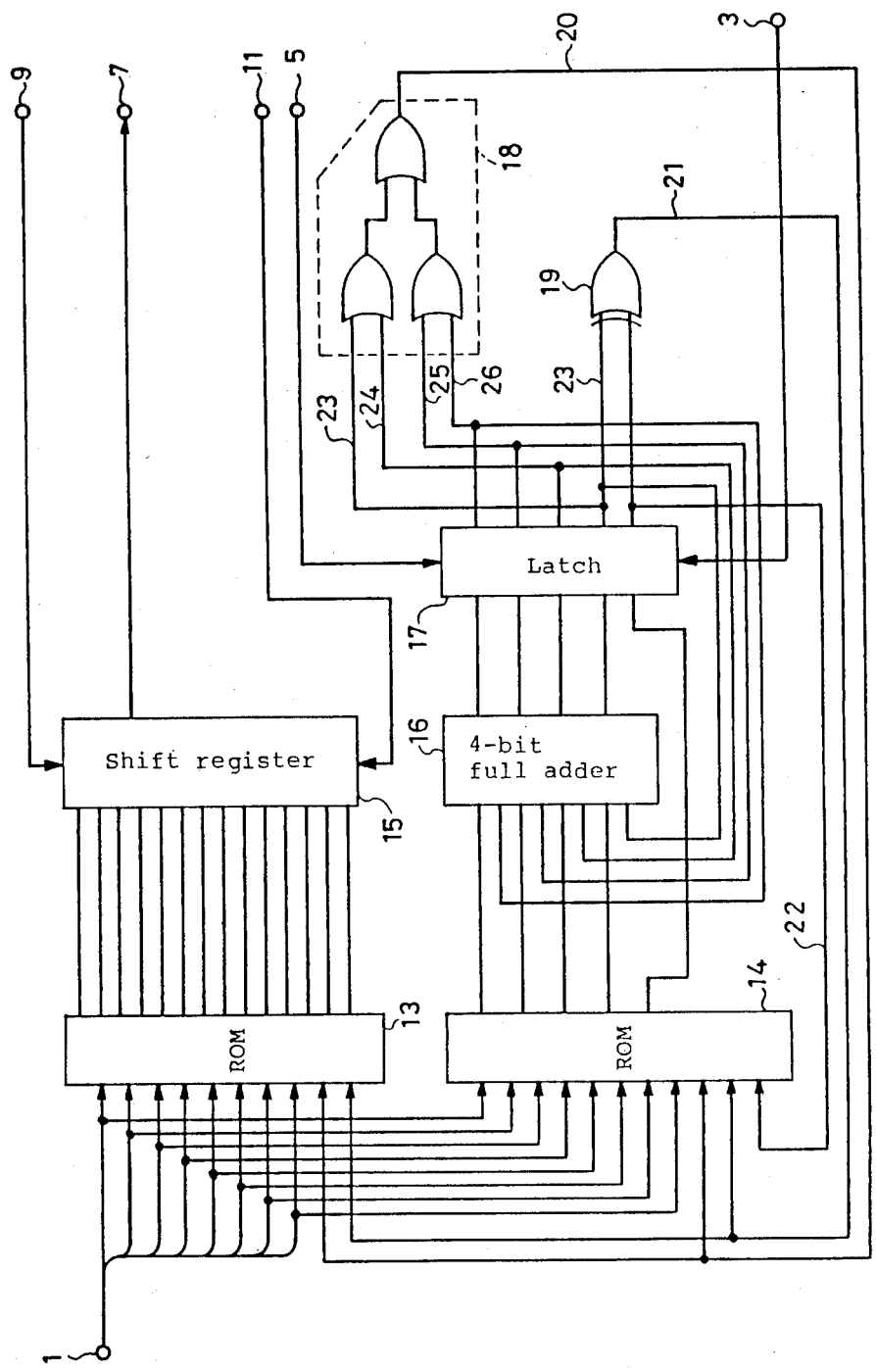
FIG. 1 is a circuit diagram of an encoder for use in the digital data recording and reproducing method in accordance with the present invention.

An encoding method in accordance with the present invention operates to convert an 8-bit digital data word into 14-bit code. As is well known, a 14-bit binary code can have sixteen thousand, three hundred and eighty-four different values. Four hundred and seven code patterns of 8-bit digital data are selected from the sixteen thousand, three hundred and eighty-four data values according to an algorithm, which will be described below. A truth table of codes is shown in Table 1, in which the 8-bit data is numbered according to the hexadecimal system.

TABLE 1

| Data | Group A Code | C D S | Group B Code | C D S |
|---|---|---|---|---|
| 00 | 01001010101010 | 0 | 01001010101010 | 0 |
| 01 | 01010100101010 | 0 | 01010100101010 | 0 |
| 02 | 01010101010010 | 0 | 01010101010010 | 0 |
| 03 | 10010010101010 | 0 | 10010010101010 | 0 |
| 04 | 10010101001010 | 0 | 10010101001010 | 0 |
| 05 | 10010101010100 | 0 | 10010101010100 | 0 |
| 06 | 10100100101010 | 0 | 10100100101010 | 0 |
| 07 | 10100101010010 | 0 | 10100101010010 | 0 |
| 08 | 10101001001010 | 0 | 10101001001010 | 0 |
| 09 | 10101001010100 | 0 | 10101001010100 | 0 |
| 0A | 10101010010010 | 0 | 10101010010010 | 0 |
| 0B | 10101010100100 | 0 | 10101010100100 | 0 |
| 0C | 01001001010010 | 0 | 01001001010010 | 0 |
| 0D | 01010010010010 | 0 | 01010010010010 | 0 |
| 0E | 01010010100100 | 0 | 01010010100100 | 0 |
| 0F | 01001001000100 | 0 | 01001001000100 | 0 |
| 10 | 10001000100100 | 0 | 10001000100100 | 0 |
| 11 | 10001001001000 | 0 | 10001001001000 | 0 |
| 12 | 10010001000100 | 0 | 10010001000100 | 0 |
| 13 | 10010010001000 | 0 | 10010010001000 | 0 |
| 14 | 01001000101010 | 0 | 01001000101010 | 0 |

TABLE 1-continued

| Data | Group A Code | C D S | Group B Code | C D S |
|---|---|---|---|---|
| 15 | 01001010100010 | 0 | 01001010100010 | 0 |
| 16 | 01010001001010 | 0 | 01010001001010 | 0 |
| 17 | 01010001010100 | 0 | 01010001010100 | 0 |
| 18 | 01010100100010 | 0 | 01010100100010 | 0 |
| 19 | 01010101000100 | 0 | 01010101000100 | 0 |
| 1A | 10010001010010 | 0 | 10010001010010 | 0 |
| 1B | 10010010100010 | 0 | 10010010100010 | 0 |
| 1C | 10100010010010 | 0 | 10100010010010 | 0 |
| 1D | 10100010100100 | 0 | 10100010100100 | 0 |
| 1E | 10100100100010 | 0 | 10100100100010 | 0 |
| 1F | 10100101000100 | 0 | 10100101000100 | 0 |
| 20 | 01000100010010 | 0 | 01000100010010 | 0 |
| 21 | 01000100100100 | 0 | 01000100100100 | 0 |
| 22 | 01000101001000 | 0 | 01000101001000 | 0 |
| 23 | 01001000100010 | 0 | 01001000100010 | 0 |
| 24 | 01001010001000 | 0 | 01001010001000 | 0 |
| 25 | 01010010000100 | 0 | 01010010000100 | 0 |
| 26 | 10000100010100 | 0 | 10000100010100 | 0 |
| 27 | 10000100101000 | 0 | 10000100101000 | 0 |
| 28 | 10001000101010 | 0 | 10001000101010 | 0 |
| 29 | 10001010010000 | 0 | 10001010010000 | 0 |
| 2A | 10010000100010 | 0 | 10010000100010 | 0 |
| 2B | 10010100010000 | 0 | 10010100010000 | 0 |
| 2C | 10100010000010 | 0 | 10100010000010 | 0 |
| 2D | 10100100001000 | 0 | 10100100001000 | 0 |
| 2E | 10010000101010 | 0 | 10010000101010 | 0 |
| 2F | 10010101000010 | 0 | 10010101000010 | 0 |
| 30 | 10100001001010 | 0 | 10100001001010 | 0 |
| 31 | 10100001010100 | 0 | 10100001010100 | 0 |
| 32 | 10101001000010 | 0 | 10101001000010 | 0 |
| 33 | 10101010000100 | 0 | 10101010000100 | 0 |
| 34 | 01000010001010 | 0 | 01000010001010 | 0 |
| 35 | 01000010010100 | 0 | 01000010010100 | 0 |
| 36 | 01000010101000 | 0 | 01000010101000 | 0 |
| 37 | 01010001000010 | 0 | 01010001000010 | 0 |
| 38 | 01010100001010 | 0 | 01010100001010 | 0 |
| 39 | 10000100001010 | 0 | 10000100001010 | 0 |
| 3A | 10000101010000 | 0 | 10000101010000 | 0 |
| 3B | 10100001000010 | 0 | 10100001000010 | 0 |
| 3C | 10101000010010 | 0 | 10101000010010 | 0 |
| 3D | 01000100000100 | 0 | 01000100000100 | 0 |
| 3E | 01001000001000 | 0 | 01001000001000 | 0 |
| 3F | 01000010000010 | 0 | 01000010000010 | 0 |
| 40 | 01010000010010 | 0 | 01010000010010 | 0 |
| 41 | 10001000000100 | 0 | 10001000000100 | 0 |
| 42 | 10001000001000 | 0 | 10001000001000 | 0 |
| 43 | 10000100000010 | 0 | 10000100000010 | 0 |
| 44 | 10100000010000 | 0 | 10100000010000 | 0 |
| 45 | 01001001010100 | 2 | 00010100100100 | −4 |
| 46 | 01001010100100 | 2 | 00100100010100 | −4 |
| 47 | 01010100100100 | 2 | 00101000100100 | −4 |
| 48 | 10001001010010 | 2 | 01001000101000 | −4 |
| 49 | 10010010010100 | 2 | 01010010010000 | −4 |
| 4A | 00010101010010 | −2 | 10000100100010 | 4 |
| 4B | 00101010100010 | −2 | 00100010010000 | 4 |
| 4C | 01010010100010 | −2 | 10000010000100 | 4 |
| 4D | 00001001001010 | −2 | 01010100001010 | 4 |
| 4E | 00010001010010 | −2 | 10000101010010 | 4 |
| 4F | 00010101000100 | −2 | 10100101010000 | 4 |
| 50 | 10100100010010 | 2 | 00001010010010 | −4 |
| 51 | 10100101001000 | 2 | 00100010001010 | −4 |
| 52 | 10001001000100 | 2 | 00101001010010 | −4 |
| 53 | 00010001001000 | 2 | 01001001010000 | −4 |
| 54 | 00100100010000 | 2 | 10010000101000 | −4 |
| 55 | 10101001010010 | 2 | 10100001001000 | −4 |
| 56 | 00101010100100 | −2 | 01001001100010 | 4 |
| 57 | 01000100010100 | −2 | 10000101000100 | 4 |
| 58 | 01001000010010 | −2 | 10001010000100 | 4 |
| 59 | 00101001010010 | 2 | 00001010000100 | −4 |
| 5A | 01010001000100 | −2 | 00010001010010 | 4 |
| 5B | 10001000101000 | −2 | 01000010001000 | 4 |
| 5C | 00101010001010 | 2 | 01001000001010 | −4 |
| 5D | 01001010000010 | 2 | 10010000010100 | −4 |
| 5E | 10010010010000 | −2 | 01000010101000 | 4 |
| 5F | 00001000010010 | −2 | 10000001001010 | 4 |
| 60 | 00010010000100 | −2 | 10010010000010 | 4 |
| 61 | 01010010001010 | 2 | 00010010000010 | −4 |
| 62 | 00010000010000 | −2 | 00010000010100 | 4 |
| 63 | 01010000101010 | −2 | 01000001000100 | 4 |

TABLE 1-continued

| Data | Group A Code | C D S | Group B Code | C D S |
|---|---|---|---|---|
| 64 | 01010100010010 | 2 | 10010000001010 | −4 |
| 65 | 10001010100010 | 2 | 00100100000010 | −4 |
| 66 | 10010100100010 | 2 | 01001000000010 | −4 |
| 67 | 10100010001010 | 2 | 10010000000010 | −4 |
| 68 | 10100010101000 | 2 | 00010100010100 | −6 |
| 69 | 10101010001000 | 2 | 00101000101000 | −6 |
| 6A | 10100101000010 | −2 | 10001010001010 | 6 |
| 6B | 01000100100010 | 2 | 00001010010100 | −6 |
| 6C | 10000010001010 | 2 | 00010100001010 | −6 |
| 6D | 10001000100010 | 2 | 00101000101000 | −6 |
| 6E | 10010010000100 | 2 | 01010000101000 | −6 |
| 6F | 00010000100100 | 2 | 10100001010000 | −6 |
| 70 | 01000100001010 | −2 | 10001010101000 | 6 |
| 71 | 01010000101010 | −2 | 10010100101000 | 6 |
| 72 | 10001001010000 | −2 | 10000100001000 | 6 |
| 73 | 10100001000100 | −2 | 10000101010100 | 6 |
| 74 | 00010001000010 | −2 | 10010101010000 | 6 |
| 75 | 00100100000100 | −2 | 10101010101000 | 6 |
| 76 | 10101010000010 | −2 | 00100001010000 | 6 |
| 77 | 00100001000100 | 2 | 01010000010100 | −6 |
| 78 | 10001000001010 | −2 | 01000010010000 | 6 |
| 79 | 01001000010000 | 2 | 00001010000010 | −6 |
| 7A | 00101000001010 | −2 | 10101000010010 | 6 |
| 7B | 10001000001000 | 2 | 01010000001010 | −6 |
| 7C | 00100101000010 | 2 | 00010100000010 | −6 |
| 7D | 01010000001000 | −2 | 00100001101000 | 6 |
| 7E | 01000010010010 | 2 | 10100000010010 | −6 |
| 7F | 10001000000010 | −2 | 10000000100010 | 6 |
| 80 | 01001001000010 | 2 | 01010000000010 | −6 |
| 81 | 01000010100100 | 2 | 00101000000010 | −6 |
| 82 | 10010000000110 | −2 | 01000001001000 | 6 |
| 83 | 01000100000010 | −2 | 10001010001010 | 6 |
| 84 | 00100010010010 | 2 | 10100000010100 | −6 |
| 85 | 01001000000100 | −2 | 10000010100010 | 6 |
| 86 | 00100010000010 | 2 | 10000010101010 | 6 |
| 87 | 10100000100010 | −2 | 10000001000100 | 6 |
| 88 | 01000100001000 | 2 | 10100000101000 | −6 |
| 89 | 00010010010000 | 2 | 00101000001010 | −6 |
| 8A | 10100001101010 | −2 | 10000101000010 | 6 |
| 8B | 00010100001010 | −2 | 10101000010010 | 6 |
| 8C | 00000101010001 | −2 | 10010100001010 | 6 |
| 8D | 10010000010010 | −2 | 10000101001010 | 6 |
| 8E | 10001000010100 | −2 | 10101000101000 | 6 |
| 8F | 01000101010100 | −2 | 10010100001010 | 6 |
| 90 | 00001010100010 | −2 | 10001010010100 | 6 |
| 91 | 00001001101000 | 2 | 01010001010100 | −6 |
| 92 | 10001010001000 | 2 | 00101001010100 | −6 |
| 93 | 10001000101000 | 2 | 00010010101000 | −6 |
| 94 | 01000101000100 | 2 | 00001010101000 | −6 |
| 95 | 00100010100010 | 2 | 00001010001010 | −6 |
| 96 | 10100001010010 | 2 | 10000100010000 | 6 |
| 97 | 10101000010000 | 2 | 00010100101010 | −6 |
| 98 | 10100010010100 | 2 | 10100000000100 | −4 |
| 99 | 10010101000100 | 2 | 01010000000100 | −4 |
| 9A | 10010001010100 | 2 | 00101000000100 | −4 |
| 9B | 10001000101010 | 2 | 10100000010010 | −4 |
| 9C | 01010101000010 | −2 | 10000001000010 | 4 |
| 9D | 00001010101010 | −2 | 00100000010010 | 4 |
| 9E | 01010010101000 | 2 | 00010100000100 | −4 |
| 9F | 00001000000010 | −2 | 10010100000100 | 4 |
| A0 | 00001001000100 | −2 | 10000101010010 | 4 |
| A1 | 10100010001000 | −2 | 01001010000010 | 4 |
| A2 | 01000101010010 | 2 | 10100000100100 | −4 |
| A3 | 01010101010010 | 2 | 01010000010010 | −4 |
| A4 | 10010000100100 | −2 | 10000001010010 | 4 |
| A5 | 01010100010000 | −2 | 00100001100100 | 4 |
| A6 | 01001010010000 | −2 | 00010000101000 | 4 |
| A7 | 10101010100010 | 2 | 00001001000010 | −4 |
| A8 | 10001000101001 | −2 | 10001001010000 | 4 |
| A9 | 00101010001000 | −2 | 10000010010010 | 4 |
| AA | 00100010101000 | −2 | 01000010100010 | 4 |
| AB | 10001010101010 | 2 | 10010001010000 | −4 |
| AC | 00100010001010 | 2 | 01010001000100 | −4 |
| AD | 10001001000100 | 2 | 01001000010100 | −4 |
| AE | 10101001000100 | 2 | 00100101010000 | −4 |
| AF | 10100100100100 | 2 | 00001010100100 | −4 |
| B0 | 00100010001010 | −2 | 10101010010000 | 4 |
| B1 | 00010100100010 | −2 | 10100100001010 | 4 |
| B2 | 00001001010010 | −2 | 01010101010000 | 4 |
| B3 | 10100010100010 | −2 | 01000010101010 | 4 |
| B4 | 01010010010000 | −2 | 01010010010000 | 4 |
| B5 | 00101000101010 | −2 | 00100001001000 | 4 |
| B6 | 10010010100100 | 2 | 10100010010000 | −4 |
| B7 | 10010001001010 | 2 | 01010001001000 | −4 |
| B8 | 10101010100010 | 2 | 00101010010000 | −4 |
| B9 | 01010010010100 | 2 | 00100100101000 | −4 |
| BA | 01001010010010 | 2 | 00010101001000 | −4 |
| BB | 01001001001010 | 2 | 00010100010010 | −4 |
| BC | 00100101010100 | 2 | 00010100101000 | −4 |
| BD | 00100101010100 | 2 | 00010010001010 | −4 |
| BE | 00100101001010 | 2 | 00001001010100 | −4 |
| BF | 10101001010010 | 2 | 00001001001010 | −4 |
| C0 | 00010100101010 | −2 | 10101010010000 | 4 |
| C1 | 10101010101010 | −2 | 10101000100100 | 4 |
| C2 | 10101010001010 | −2 | 10100100101000 | 4 |
| C3 | 10100010101010 | −2 | 10100100010100 | 4 |
| C4 | 10100100010000 | −2 | 10010100010010 | 4 |
| C5 | 10010010101010 | −2 | 10010010101000 | 4 |
| C6 | 01010010001000 | −2 | 10010010001010 | 4 |
| C7 | 01001001001000 | −2 | 10001010100100 | 4 |
| C8 | 01001000100100 | −2 | 10001010010010 | 4 |
| C9 | 00101010100010 | −2 | 10000100101010 | 4 |
| CA | 00100101001000 | −2 | 01010100101000 | 4 |
| CB | 00100100010010 | −2 | 01010100010100 | 4 |
| CC | 00100010010100 | −2 | 01001010101000 | 4 |
| CD | 00010100101010 | −2 | 01001010010100 | 4 |
| CE | 00010010010010 | −2 | 01000101010100 | 4 |
| CF | 00010010001010 | −2 | 01000101001010 | 4 |
| D0 | 00101010010010 | −2 | 10001000010000 | 4 |
| D1 | 10101010010100 | −2 | 10000100001001 | 4 |
| D2 | 10010101010010 | 2 | 00101010001000 | −4 |
| D3 | 10010100101010 | 2 | 00010010010100 | −4 |
| D4 | 10100101010100 | −2 | 10101001001000 | 4 |
| D5 | 10100101001010 | −2 | 10010101001000 | 4 |
| D6 | 01010101010100 | −2 | 10010100101000 | 4 |
| D7 | 01010101001010 | −2 | 10010100010100 | 4 |
| D8 | 01010010101010 | −2 | 10001001010100 | 4 |
| D9 | 00101010101010 | −2 | 10001001001010 | 4 |
| DA | 10010101010010 | −2 | 01001010010100 | 4 |
| DB | 10101010101010 | 2 | 00001010000010 | −4 |
| DC | 00100000010000 | 0 | 00100000010000 | 0 |
| DD | 00001000000100 | 0 | 00001000000100 | 0 |
| DE | 00010000001000 | 0 | 00010000001000 | 0 |
| DF | 00101000010000 | 0 | 00101000010000 | 0 |
| E0 | 00100001000010 | 0 | 00100001000010 | 0 |
| E1 | 00001010010000 | 0 | 00001010010000 | 0 |
| E2 | 00101010000000 | 0 | 00101010000000 | 0 |
| E3 | 00101001000010 | 0 | 00101001000010 | 0 |
| E4 | 00100001010100 | 0 | 00100001010100 | 0 |
| E5 | 00010101000010 | 0 | 00010101000010 | 0 |
| E6 | 00010000101010 | 0 | 00010000101010 | 0 |
| E7 | 00100100000100 | 0 | 00100100000100 | 0 |
| E8 | 00100010000100 | 0 | 00100010000100 | 0 |
| E9 | 00010100010000 | 0 | 00010100010000 | 0 |
| EA | 00010000100010 | 0 | 00010000100010 | 0 |
| EB | 00001001001000 | 0 | 00001001001000 | 0 |
| EC | 00001000010010 | 0 | 00001000010010 | 0 |
| ED | 00100101000100 | 0 | 00100101000100 | 0 |
| EE | 00100100100010 | 0 | 00100100100010 | 0 |
| EF | 00100010100100 | 0 | 00100010100100 | 0 |
| F0 | 00010000001010 | 0 | 00010000001010 | 0 |
| F1 | 00010010100010 | 0 | 00010010100010 | 0 |
| F2 | 00010001010010 | 0 | 00010001010010 | 0 |
| F3 | 00101010101000 | 0 | 00101010101000 | 0 |
| F4 | 00010101001010 | 0 | 00010101001010 | 0 |
| F5 | 00010010001000 | 0 | 00010010001000 | 0 |
| F6 | 00010001000100 | 0 | 00010001000100 | 0 |
| F7 | 00001010000100 | 0 | 00001010000100 | 0 |
| F8 | 00100010010010 | 0 | 00100010010010 | 0 |
| F9 | 00101010100100 | 0 | 00101010100100 | 0 |
| FA | 00101010010010 | 0 | 00101010010010 | 0 |
| FB | 00101010010010 | 0 | 00101010010010 | 0 |
| FC | 00101001001010 | 0 | 00101001001010 | 0 |
| FD | 00010101010010 | 0 | 00010101010010 | 0 |
| FE | 00100100101010 | 0 | 00100100101010 | 0 |
| FF | 00010010101010 | 0 | 00010010101010 | 0 |

The 407 selected code patterns satisfy the following conditions: (1) The value of an end bit of the 14-bit code is "0". (2) At least one bit of value "0" is inserted between two bits of value "1" in the code, the number of bits of value "0" inserted therebetween being restricted to eight and below. (3) The number of consecutive bits of the 14-bit code of value "0" at both of the end parts of the code are restricted to 4 and below. Therefore, one bit of value "0" up to eight bits of value "0" are contained between two bits of value "1" in the code sequence.

According to these conditions, the following numbers of 14-bit patterns (as shown in Table 1) are selected according to the respective value of the code word digital sum (hereinafter referred to as CDS):

105 patterns at CDS=0;
68 patterns at CDS=+2;
83 patterns at CDS=−2;
58 patterns at CDS=+4;
45 patterns at CDS=−4;
25 patterns at CDS=+6; and
25 patterns at CDS=−6.

The two-hundred fifty-six 14-bit code patterns shown in Table 1 are thus selected from the above-mentioned four hundred and seven 14-bit patterns.

Figure 2:
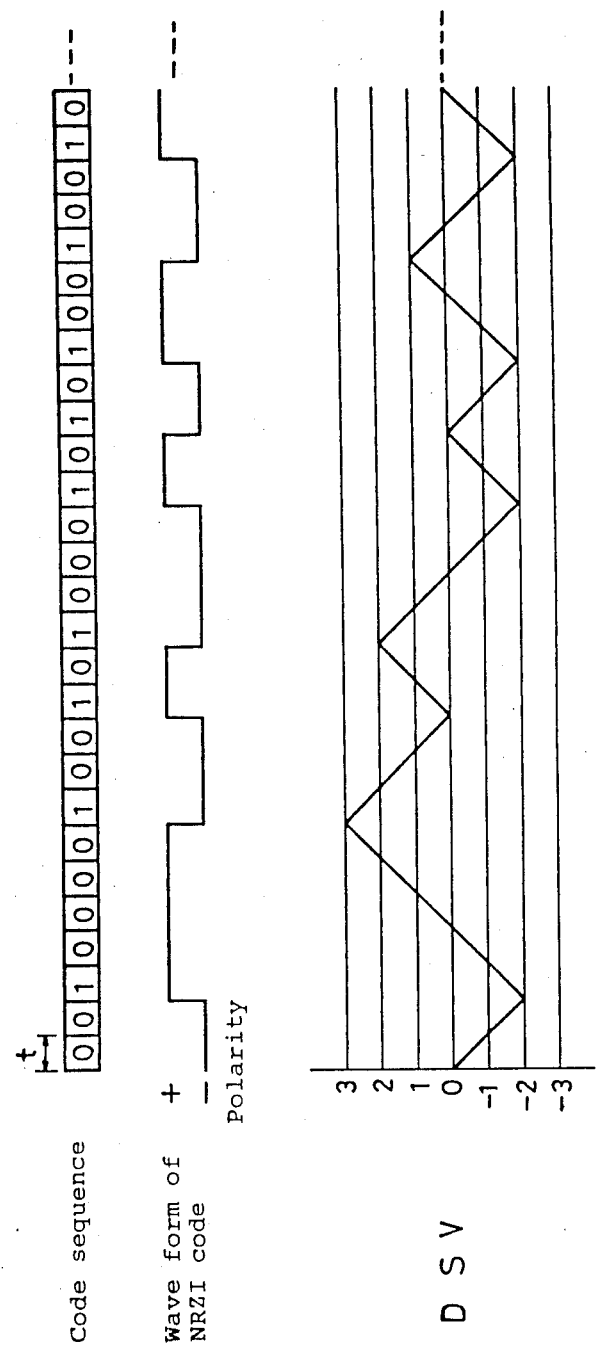
FIG. 2 is a timing chart showing a change of polarity in a digital code sequence and a change of DSV (digital sum variation) in a code sequence wherein an eight bit digital data word is encoded into 14-bit code, in accordance with the embodiment of the present invention.

Digital Sum Variation (hereinafter referred to as DSV) is a sum wherein all positive values "1" corresponding to a hill portion and all negative values "−1" corresponding to a valley portion of the waveform which is encoded by an NRZI system are added as shown in FIG. 2. In the present invention, a polarity of the starting bit of NRZI encoding is made negative. Taking this into consideration, the above-mentioned 14-bit code is assigned to successive 8-bit words of digital data as follows:

A code word digital sum (which is a value of the DSV from the head to end of the NRZI code word) of the 14-bit code is calculated, and the 14-bit codes in which the CDS is equal to zero (CDS=0) are allotted uniquely to each of the digital data words in one-to-one correspondence. (In FIG. 11(a) and FIG. 11(b), for example, the respective CDSs are "+4" and "0".) However, the number of 14-bit codes in which CDS equals "0" is less than the 256 words which are required. Therefore, remnants are allotted to 14-bit codes for the cases that CDS≠0 are combined, and either of the two is selected depending on the digital sum variation. Respective "pairs" of the codes are combined in accordance with the following pairs of CDSs:

CDS=+2 and CDS=−4,
CDS=−2 and CDS=+4,
CDS=+2 and CDS=−6, and
CDS=−2 and CDS=+6 which are allotted to the digital data. In the above-mentioned pairs of code, as shown in Table 1, a code having a small CDS in value, for example, a code of CDS=±2 is grouped in a "group A". The codes of CDS=±4 and CDS=±6 are grouped in a "group B". The code of CDS=0 belongs to both group A and group B.

A selecting method of 14-bit codes corresponding to the 8-bit words of digital data is elucidated as follows: The encoding of the digital data is processed according to a value of the DSV at an end of the present code corresponding to the digital data and a polarity of the NRZI encoded digital data. The polarity is positive when the end bit of the above-mentioned NRZI code is assigned to the positive polarity "1" and negative when the end bit is "0". The head bit of the code is made negative, and the DSV is determined from the head bit of the code.

Figure 12A:
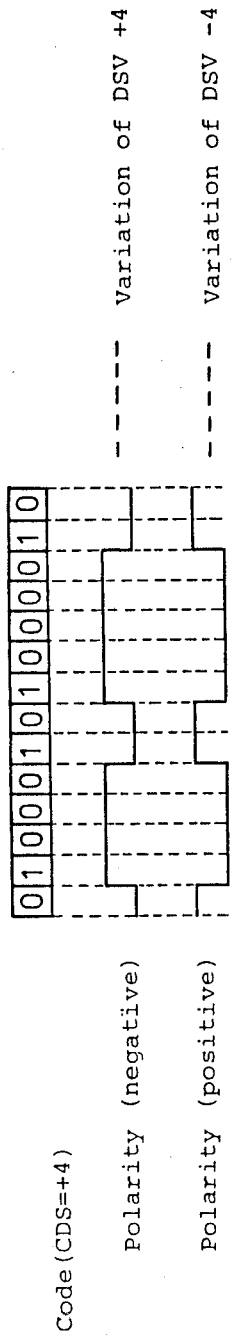
FIG. 12(a), FIG. 12(b) and FIG. 12(c) are timing charts showing a relation between the CDS and the DSV of the embodiment in accordance with the present invention.
Figure 12B:
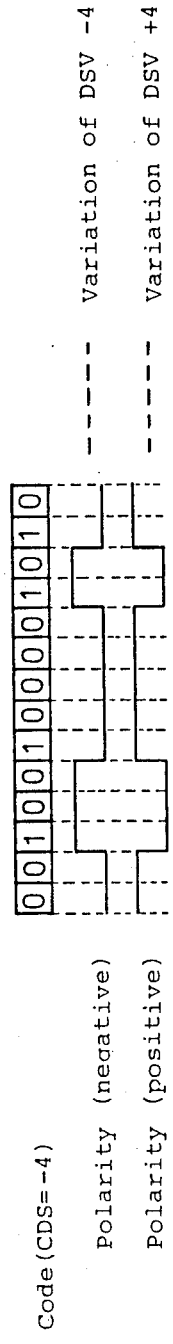
Figure 12C:
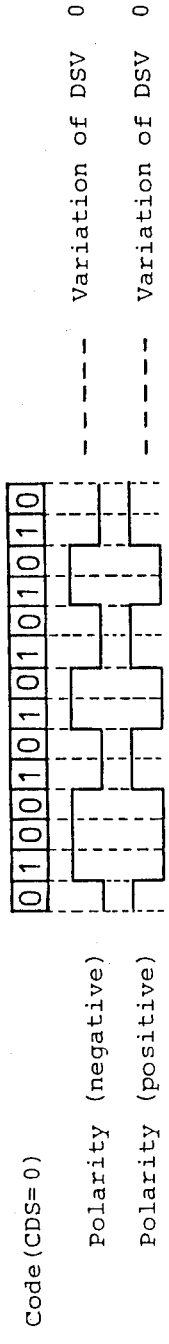

The change of the DSV value and the polarity are shown in FIG. 2. The polarity of the waveform of the NRZI encoded data alternates at the bit of value "1" of the code sequence. The relation between the CDS and the DSV of the code is as shown in FIG. 12. As shown in FIG. 12(a), the code wherein the value of CDS is positive increases DSV when the polarity of the starting point of the code is negative, and decreases DSV when the polarity of the starting pont of the code is positive. As shown in FIG. 12(b), the code wherein the value of CDS is negative decreases DSV when the polarity of the starting point of the code is negative, and increases DSV when the polarity of the starting point of code is positive. As shown in FIG. 12(c), the code wherein the value of CDS is "0" maintains DSV at a constant value independent of the polarity of the starting point of the code.

The manner of selecting the code is shown in Table 2. In Table 2, the polarity of the end bit of the preceding code is designated "POL".

TABLE 2

| Polarity of DSV at the end point of the preceding code | Polarity at the end point of the preceding code (POL) | Usable code | Changing of DSV | |
| --- | --- | --- | --- | --- |
| Positive | Positive | Code wherein CDS is positive or zero | Decrease or constant | |
| | Negative | Code wherein CDS is negative or zero | Decrease or constant | B |
| Zero | Positive | Code of group A | +2 or 0 or +2 | C |
| | Negative | | | |
| Negative | Positive | Code wherein CDS is negative or zero | Increase or constant | D |
| | Negative | Code wherein CDS is positive or zero | Increase or constant | E | in which the CDS is not equal to "0". However, when 14-bit codes in which CDS is not equal to zero (CDS≠0) are allotted to the digital data by one-to-one correspondence, the DSV thereof is liable to diverge. In order to prevent divergence, two kinds of 14-bit codes In accordance with Table 2, the code is selected as DSV goes to a negative value by referring to POL when the value of DSV at the end of the preceding code is positive, and it goes to positive value by referring to POL when the polarity of DSV at the end of the preceding code is negative. Therefore, the change of the value of DSV is restricted in a constant range wherein the value "0" is in the center of the constant range.

As shown in column A of Table 2, when the polarity of DSV at the end point of the code which corresponds to a preceding digital data word of the present digital data word is positive, the polarity (POL) is also positive. The code wherein CDS is positive or zero is selected from the group A and the group B corresponding to the digital data, and is allotted to the digital data. As shown in FIG. 12(a), when POL is positive, DSV can be shifted to negative at the same absolute value of CDS. Furthermore, when both CDSs of the codes of group A and B are "0", the code wherein CDS is equal to "0"0 is allotted, and the value of DSV is held at a constant value as shown in FIG. 12(c).

As shown in column B of Table 2, when the polarity of DSV at the end point of the code which corresponds to a preceding digital data word is positive, and the POL is negative, the code wherein CDS is negative or zero is selected from the group A and the group B corresponding to the digital data. As shown in FIG. 12(b) and FIG. 12(c), when a code in which CDS is negative is selected, if POL is negative, DSV can be shifted to negative at an absolute value of CDS. Moreover, when a code wherein CDS is "0" is selected, the value of DSV is held at constant value.

As shown in column D of Table 2, when the polarity of DSV at the end point of the code which corresponds to a preceding digital data word of the present digital data is negative and the POL is positive, the code wherein CDS is negative or zero is selected from the group A and the group B corresponding to the digital data, and is allotted to the digital data. As shown in FIG. 12(b) and FIG. 12(c), when a code in which CDS is negative is selected, if POL is positive, DSV can be shifted to positive for an absolute value of CDS. Moreover, when a code in which CDS is "0" is selected, the value of DSV is held at a constant value.

As shown in column E of Table 2, when the polarity of DSV at the end point of the code which corresponds to a preceding digital data word of the present digital data word is negative and the POL is negative, the code wherein CDS is positive or zero is selected from the group A and the group B corresponding to the digital data, and is allotted to the digital data. As shown in FIG. 12(a) and FIG. 12(c), when a code in which CDS is positive is selected, if POL is negative, DSV can be shifted to positive for an absolute value of CDS. Moreover, when a code in which CDS is "0" is selected, the value of DSV is held at a constant value.

When the polarity of DSV at the end point of the code which corresponds to the preceding digital data word is negative, a DSV-flag corresponds to the bit with value "1". When the value of DSV for the above-mentioned condition is positive, the DSV-flag corresponds to the bit with value "0". When the polarity for the above-mentioned condition is negative, a polarity flag POL corresponds to the bit of value "1", and when the polarity for the above-mentioned condition is positive, the polarity signal POL corresponds to the bit of value "0". When the exclusive logical sum of the DSV-flag and the polarity signal POL is "1", the encoding code wherein CDS is negative or zero is allotted to the digital data.

As shown in column C of Table 2, when the polarity of DSV at the end point of the code which corresponds to the preceding digital data word of the present digital data word is zero, the code of the group A wherein the absolute value of CDS is small is allotted to the digital data independent of the polarity, and variance of DSV is thus ±2 or zero. As a result, the value of DSV of the code sequence is limited to a constant range within a range of a constant value "0". In the present embodiment, for example, the absolute value of DSV is equal to or within +9, and the value of CDS is "0", "+2" or "+4" at the end part of the respective codes.

Figure 3:
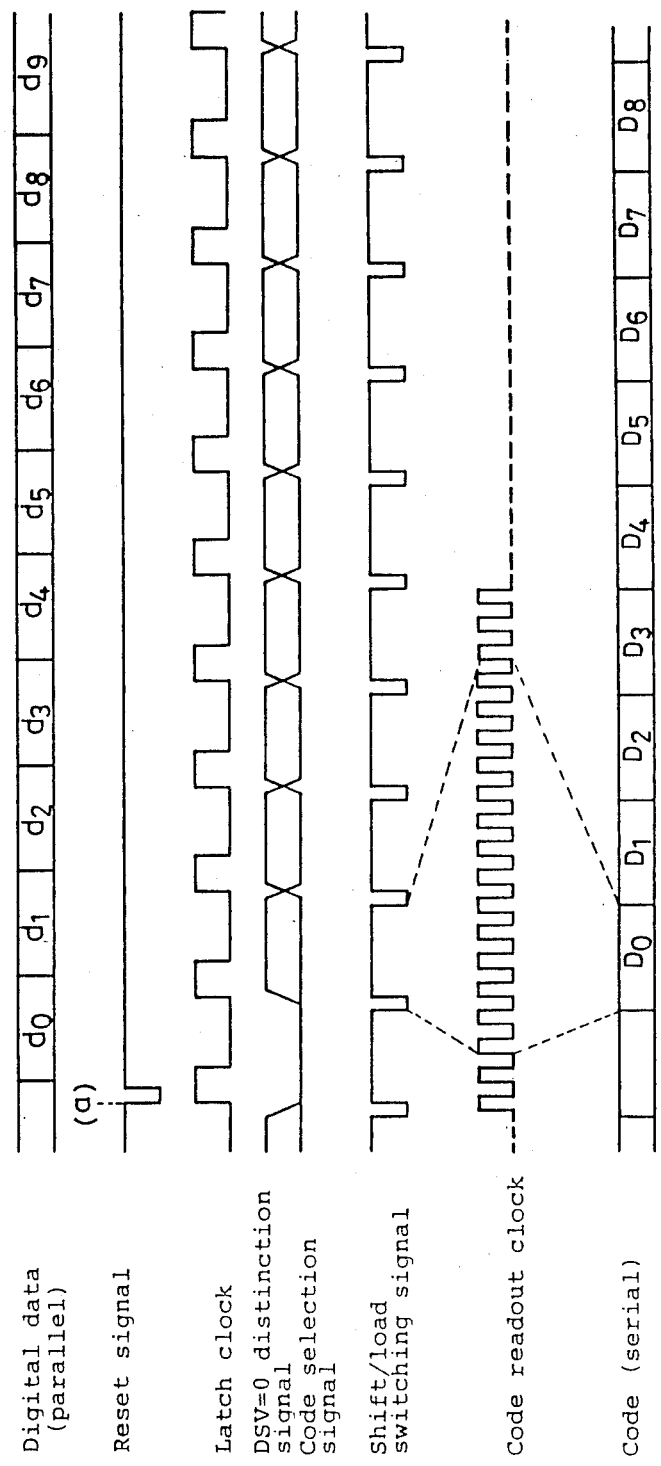
FIG. 3 is a timing chart showing an operation of the encoder in the embodiment in accordance with the present invention.

An example of an encoding circuit for encoding the algorithm in accordance with the present invention is shown in FIG. 1, and the timing chart for the operation of the encoding circuit is shown in FIG. 3.

In FIG. 1, parallel 8-bit digital data words are inputted to a ROM 13 and a ROM 14 through an input terminal 1. A reset signal is applied to a five bit latch 17 through a reset input terminal 3, and a latch clock is inputted to the latch 17 through a latch clock input terminal 5. An output code is issued from a code output terminal 7. A shift/load switching signal is applied to a 14-bit shift register 15 through a shift/load switching signal input terminal 9. A code readout clock is also inputted to the shift register through a code readout clock terminal 11. The output of the code output ROM 13 is applied to the shift register 15. ROM 14 issues CDS signals and polarity signals. A 4-bit full-adder 16 is connected between the ROM 14 and the latch 17. A distinction circuit 18 is formed by three OR gates and detects the value of DSV at the end point of a code in which a preceding digital data word of the present digital data word is encoded. A selection circuit 19 is formed by an exclusive OR gate.

The encoding operation is shown by the timing chart of FIG. 3. A low level reset signal for an initial setting is inputted to the latch 17 at a time as shown in FIG. 3 at (a), and the output level of the latch 17 is set to "0". As a result, the distinction signal from the distinction circuit 18, the selection signal and the polarity signal are set to "0". Parallel 8-bit digital data words are inputted to the ROM 13 and the ROM 14 in order of $d_0$, $d_1$ $d_2$, $d_3$, ... through the digital data input terminal 1. Furthermore, the distinction signal and the selection signal are inputted to the ROM 13 over signal lines 20 and 21, respectively. The distinction signal, the selection signal and the polarity signal are inputted to the ROM 14 over signal lines 20, 21 and 22, respectively. The distinction signal is an output signal wherein a value of DSV at the end point of a preceding digital data word of the present digital data word is discriminated by the distinction circuit 18. When DSV is "0", the output signal is "0". When DSV is not "0", the output signal is "1". The selection signal, on the other hand, is an output signal of the selection circuit 19 and is equal to an exclusive logical sum of the polarity signal (A positive signal is "0", and a negative signal is "1".) and a DSV-flag 23 (A positive flag is shown by "0", and a negative flag is shown by "1".) which shows the polarity of DSV.

The ROM 13 processes the 8-bit digital data word, the distinction signal and the selection signal, and then outputs a 14-bit code to the shift register 15 according to conditions as shown in Table 2. As shown in Table 2, when the distinction signal (DSV) is "0", the code of the group A wherein an absolute value of CDS is smaller than one of two codes corresponding to the 8-bit digital data word which is encoded is selected.

When the distinction signal is "1" and the selection signal is "0", namely, in Table 2 when DSV at the end point of the code wherein the preceding digital data word of the present digital data word is encoded is positive and the polarity is also positive, and furthermore, when DSV is negative and the polarity is negative, the code wherein CDS is positive or zero is selected from the above-mentioned two codes (A or B). When the selection signal is "1", namley in Table 2 when DSV is positive and the polarity is negative, furthermore when the DSV is negative and the polarity is positive, the code wherein CDS is negative or zero is selected from the above-mentioned two codes (A or B).

A shift/load switching signal is inputted to the shift register 15 through the shift/load switching signal input terminal 9, and the code which is outputted from the ROM 13 is parallely inputted to the shift register 15 when the shift/load switching signal turns to a low level as shown in FIG. 3. Code readout clocks are inputted at a timing as shown in FIG. 3 from the clock input terminal 11, and the above-mentioned code is serially read. The code which is converted to the serial code is issued from the output terminal 7 in order of $D_0$, $D_1$, $D_2$, $D_3$, ... at a timing as shown in FIG. 3. In FIG. 3, the time period is enlarged on the abscissa which is drawn by dotted lines. The code which is outputted by the ROM 13 is decided in the ROM 14 in view of the input 8-bit digital data, the distinction signal and the selection signal.

A variation of DSV which is caused by CDS of the code which is issued from the ROM 14 is outputted in accordance with the polarity signal. When the variation of DSV is zero, the variation is represented by the binary "0000", and similarly when the variations of DSV are +2, +4, +6, −2, −4 and −6, the respective variations are represented by the binary codes "0010", "0100", "0110", "1110", "1100" and "1010", respectively. These variations are inputted to the 4-bit full-adder 16. When the number of the bit "1" of the above-mentioned decided code is odd, the ROM 14 reverses the polarity of the input polarity signal and output to the latch 17. When the number of the bit "1" is even, the ROM 14 does not reverse the polarity of the input polarity signal and output to the latch 17.

In the 4-bit full adder 16, the value of DSV at the end point of the code sequence wherein the preceding digital data of the present digital data are encoded is issued from the latch 17, and the variations of DSV in accordance with the code of the present digital data are added. The value of DSV at the end point of the code wherein the above-mentioned present digital data is encoded is output to the latch 17. In the latch 17, the inputted new DSV and the polarity signal are held by a rise of a latch clock which is inputted from the latch clock input terminal 5 at a timing as shown in FIG. 3.

The value of DSV at the end point of the code wherein the above-mentioned present digital data is encoded and output from the latch 17 is applied to the distinction circuit 18 over line 23−26 and is used for encoding the next digital data word with respect to the present digital data word.

The polarity signal is inputted to the selection circuit 19 and to the ROM 14 and is used for encoding the next digital data word. The above-mentioned process is repeated and the encoding is continued. Secondly, an NRZI coding is applied to the code sequence wherein the digital data sequence is encoded into an NRZI code sequence, and the NRZI code is recorded on the magnetic recording medium through a rotary transformer and a magnetic head of the recording part. In the reproduction process, the NRZI code sequence is reproduced through the common rotary transformer and a magnetic head of the reproducing part, and the NRZI decoding is processed in the NRZI decoder so that decoding of the 8–14 code may be performed.

Figure 4:
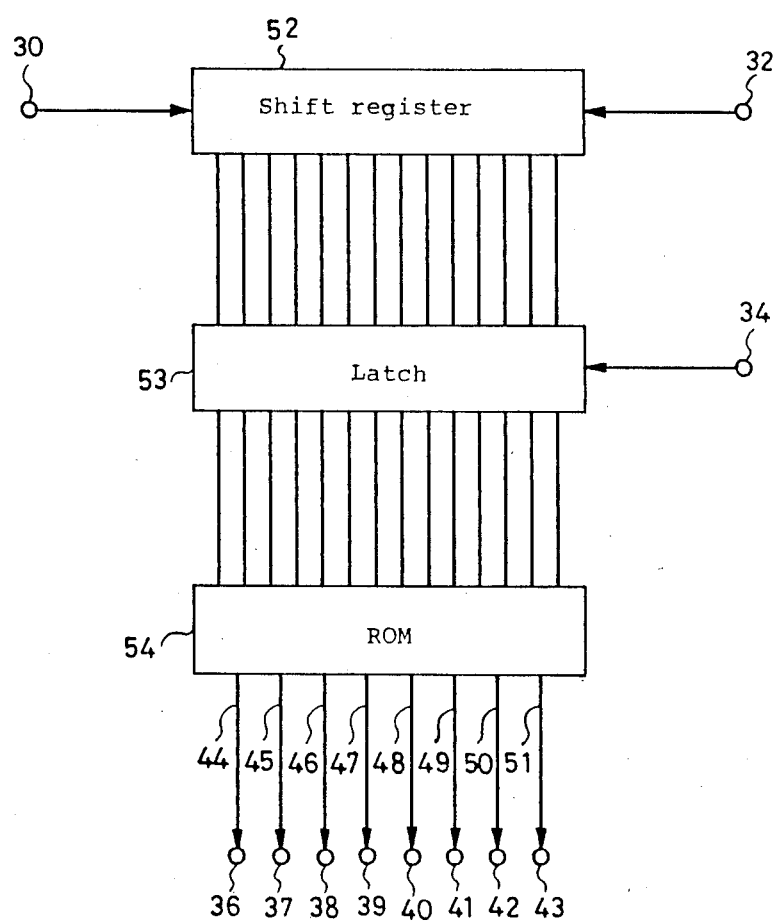
FIG. 4 is a circuit diagram of a decoder in the embodiment in accordance with the present invention.
Figure 5:
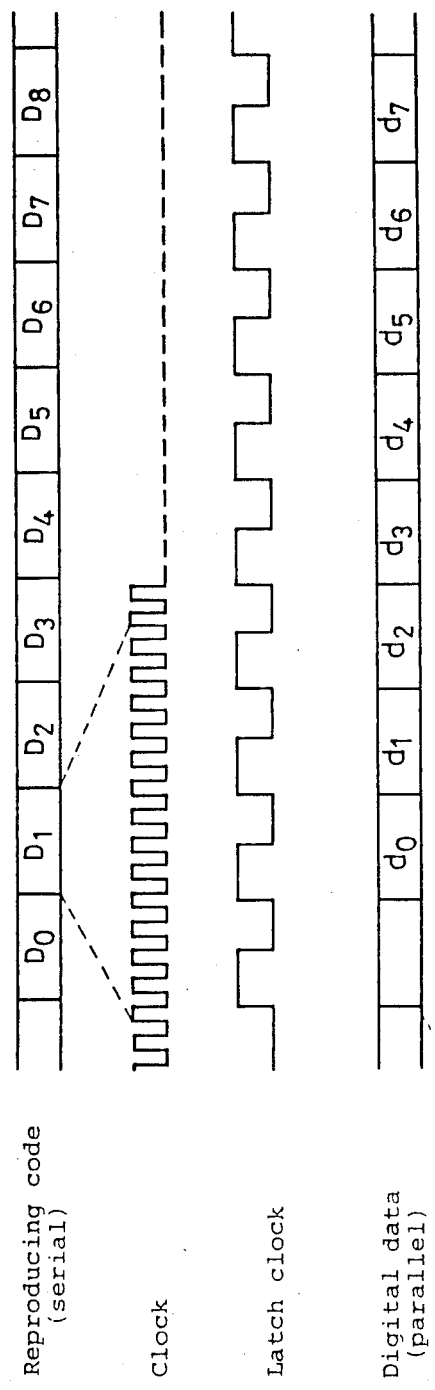
FIG. 5 is a timing chart showing an operation of the decoder shown in FIG. 4.

An embodiment of a decoding circuit in accordance with the present invention is shown in FIG. 4. The code is inputted to a 14-bit shift register 52 through an input terminal 30. Clock signals are inputted through an input terminal 32. Output signals of the shift register 52 are applied to a 14-bit latch 53. Latch clock signals are inputted through a latch clock input terminal 34. Output signals of the latch 53 are inputted to a ROM 54 for decoding. Decoded digital data are issued parallelly from output terminals 36–43. A timing chart showing the operation of the decoding circuit is shown in FIG. 5. As shown, the reproduced code is inputted to the shift register 52 sequentially in the order, $D_0$, $D_1$, $D_2$ ... . The clock signals are inputted to the shift register 52 through the terminal 32 at a timing as shown in FIG. 5, where the range of the clock along the abscissa is shown enlarged by a dotted line.

The code sequence which is sequentially inputted from the terminal 30 is shifted bit by bit so as to be synchronous with the clock before being issued to the latch 53 from the shift register 52. The reproduced code sequence is separated into 14-bit code words and is issued to the ROM 54 from the latch 53. For this object, the latch clock which is formed by detecting the frame synchronizing signal (as will be described below) is inputted into the latch 53 through the terminal 34 at a timing as shown in FIG. 5, and the data is latched by the rise of the clock pulse. The 14-bit code which is issued from the latch 53 is inputted to the ROM 54 as an address, and 8-bit digital data 44–51 corresponding to the above-mentioned 14-bit code are outputted. The decoded digital data are outputted parallelly from the output terminals 36–43.

As mentioned above, since the number of bits of value "0" inserted between two "1" bits is restricted to be from one to eight, the code may be recorded on the magnetic recording medium. The minimum magnetization reversal interval becomes 1.14 T (where T is a periodic time of the digital data); the maximum magnetization reversal interval becomes 5.14 T; and DR becomes 1.14 so that high density recording may be realized. The encoded digital data of the respective pairs of CDS=+2 and CDS=−4, CDS=−2 and CDS=+4, CDS=+2 and CDS=−6 and CDS=−2 and CDS=+6 are allotted to the digital data, and when DSV is not zero, DSV can be restricted to ±9 and below so that the DC component is decreased. Correspondence between the digital data and the code as shown in Table 1 is changeable. For instance, if two codes wherein polarities and absolute values of CDS are different from each other are combined, the combinations of the codes may be freely selected.

The frame synchronizing signal is elucidated as follows: The value of the end bit of the code is "0", and one or more "0" bits are contained between two "1" bits. However, the maximum number of the successive "0" bits are limited to eight in each 14-bit code. Furthermore, the maximum number of the successive "0" bits is limited to four at the head part and the tail part of the code. Furthermore, the 14-bit code in which three or more "0" bits continue at the head part or the tail part is excepted from the code. Moreover, the code in which seven or more "0" bits follow the above-mentioned successive three "0" bits and a "1" bit which is inserted between the two groups of "0" bits is also excepted from the code. Therefore, the pattern of "10000000" appears at the successive part of the code; however, the successive patterns of "10000000" do not appear at the front and the rear of the above-mentioned pattern. Therefore, the pattern of "1000000010000000" does not appear in the code sequence. The bit "10" is thus added to the end of the pattern in order to meet the above-mentioned restriction of succession of "0" bits. Similarly, the bit "10" is added to the head of the pattern in order to meet the restriction of continuation of the "0" bits and to make CDS of the frame synchronizing signal equal to zero.

The following 28-bits of "XXXXXXXXXX10000000100000010" are thus used for a frame synchronizing signal. (The part which is shown by "X" represents an optionally decided ten bits of "10" wherein the restriction of succession of the "0" bits is satisfied and CDS of the 28-bit synchronizing signal becomes "0".)

In FIG. 6(a), the block diagram of a signal processing circuit including an addition part for the frame synchronizing signal and a detection part in accordance with the present invention is shown. The digital data are inputted to a frame forming part 62 through a digital data input terminal 60. The output of the frame forming part 62 is applied to an encoder 63. The output of the encoder 63 is applied to a frame synchronizing a signal addition part 64. The output of the frame synchronizing signal addition part 64 is applied to an NRZI encoder 65. The output of the NRZI encoder 65 is recorded on a recording medium through a recording part 66.

In a reproduction process, as shown in FIG. 6(b), the recorded signals are detected by a reproduction part 67 and are decoded by an NRZI decoder 68. The output of the NRZI decoder is inputted to a frame synchronizing a signal detection part 69 and a shift register 70. The output of the shift register 70 is applied to a decoder 71. An encoded digital data separation signal is outputted from the frame synchronizing signal detection part 69 and is inputted to the shift register 70 via line 74. The output of the decoder 71 is applied to a shift register 72 and is issued from a digital data output terminal 73.

Figure 7:
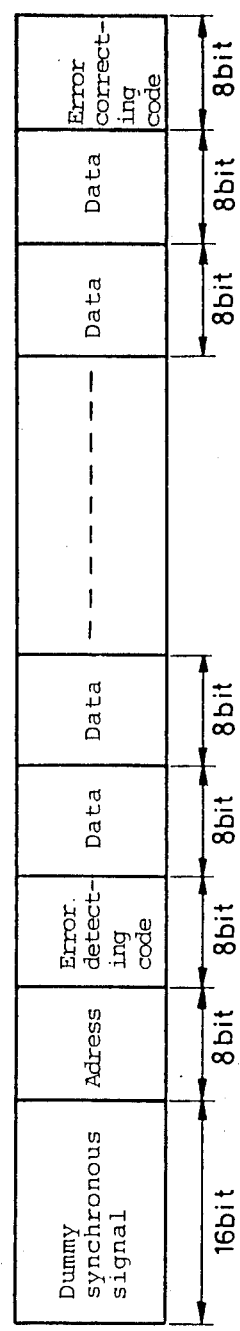
FIG. 7 is a frame construction in the embodiment in accordance with the present invention.

As shown in FIG. 7, a dummy synchronizing signal, an address, an address error detecting code and an error correction code are added to a digital data word, thereby to form a frame in the frame forming part 62. The frame is outputted to the encoder 63 and is encoded in accordance with the above-mentioned 8-14 encode algorithm by the encoder 63, the encoded frame signal being applied to the frame synchronizing signal addition circuit 64. In the frame synchronizing signal addition circuit 64, the dummy synchronizing signal which consists of a 28-bit signal is replaced by the normal synchronizing signal of "XXXXXXXXXX10000000100000010".

Figure 8:
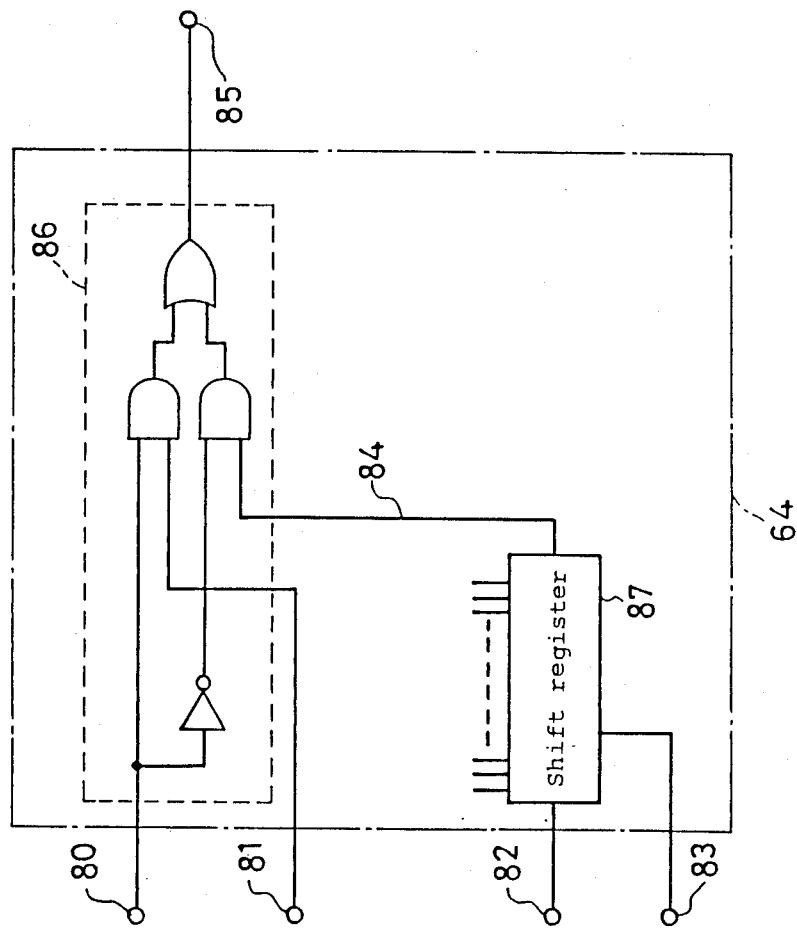
FIG. 8 is a circuit diagram of the circuit for adding the frame synchronizing signal of the embodiment in accordance with the present invention.
Figure 9:
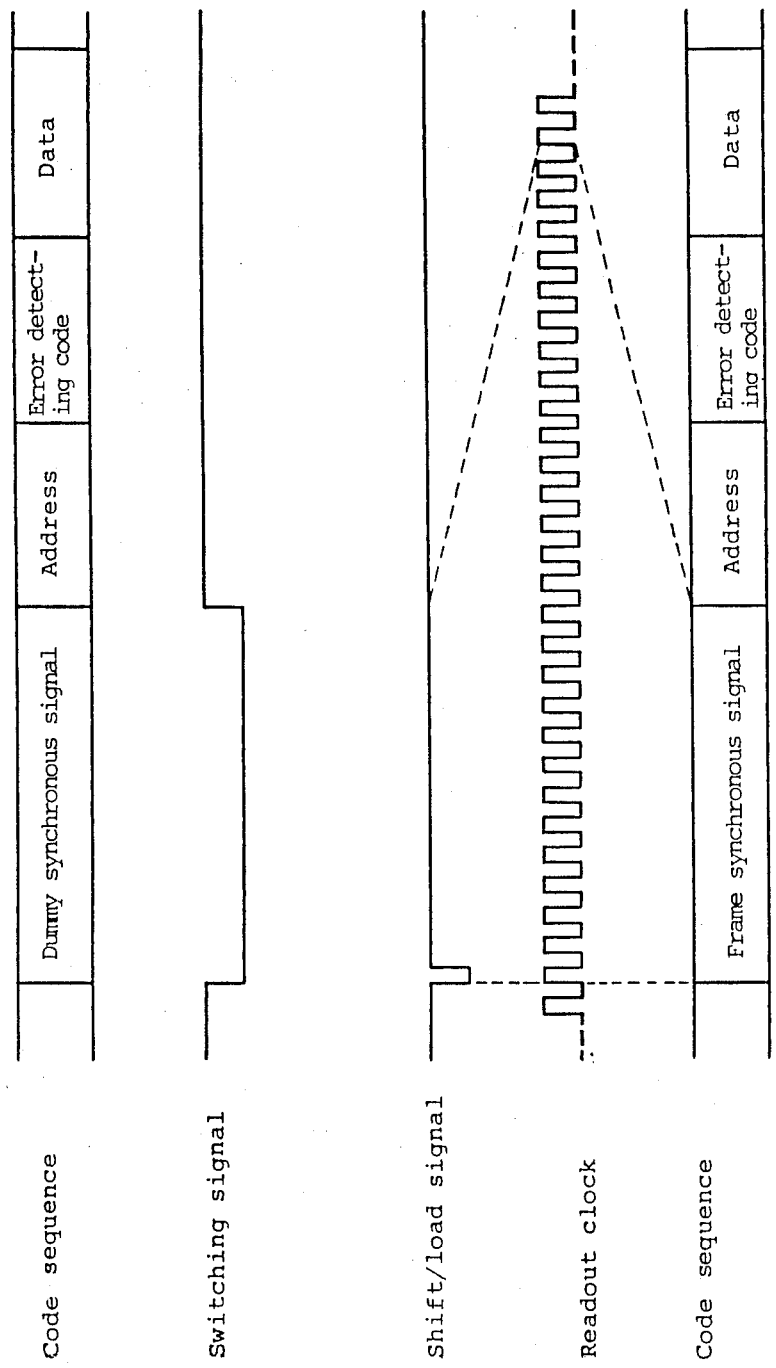
FIG. 9 is a timing chart showing an operation of the circuit for adding the frame synchronizing signal shown in FIG. 8.

The frame synchronizing signal addition circuit 64 is shown in FIG. 8. A switching signal and the code sequence are inputted to a switching circuit 86 in accordance with the timing as shown in FIG. 9 through a switching signal input terminal 80 and the code sequence input terminal 81, respectively. The code sequence wherein the frame synchronizing signal is replaced is outputted from the code output terminal 85. A shift/load signal and a readout clock are inputted to a shift register 87 in accordance with the timing as shown in FIG. 9 through a shift/load signal input terminal 82 and a readout clock input terminal 83, respectively. The shift register 87 is a 28-bit parallel input and serial output shift register. The shift register 87 reads a frame synchronizing signal in accordance with the shift/load signal 82 and outputs the frame synchronizing signal over signal line 84 to the switching circuit 86 in synchronization with readout clock 83. In the switching circuit, the dummy synchronizing signal of the code sequence is thus replaced by the frame synchronizing signal before the code is outputted.

Figure 10:
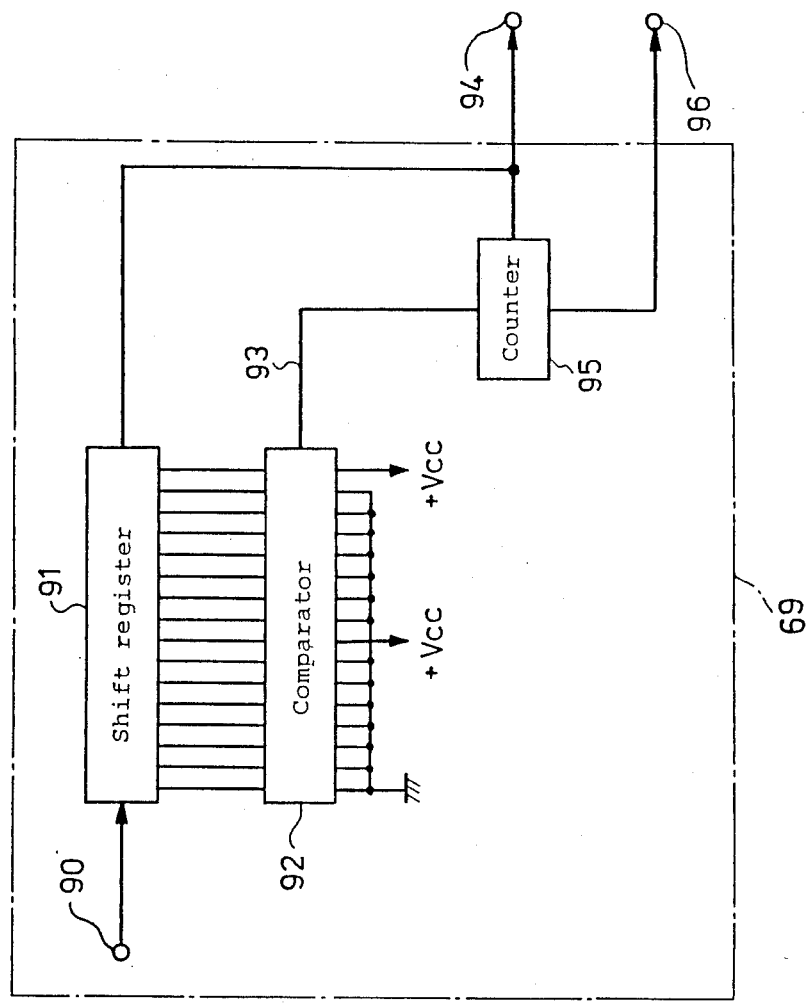
FIG. 10 is a circuit diagram of the detecting circuit of the embodiment in accordance with the present invention.

The frame synchronizing signal detection circuit 69 is shown in FIG. 10. The reproduced code sequence is inputted to a 16-bit shift register 91 in the frame synchronizing signal detection circuit 69 from input terminal 90. The above-mentioned reproduced code sequence is shifted bit-by-bit by the clock signal 94 in the shift register 91. The output of the shift register 91 is inputted to a comparator 92 and is compared with a 16-bit pattern "1000000010000000" which does not appear in the code sequence of the 28-bit frame synchronizing signal, and the synchronizing signal of each frame is detected. When the ouput of the shift register 91 agrees with the 16-bit pattern, a detecting signal 93 is output from the comparator 92 and is applied to a counter 95. The counter 95 is loaded with a predetermined value by the detecting signal 93 and is operated as a counter wherein the figure is taken up at fourteen. As a result, a code dividing signal 96 for dividing the reproduced code sequence into respective codes is outputted.

Figure 6:
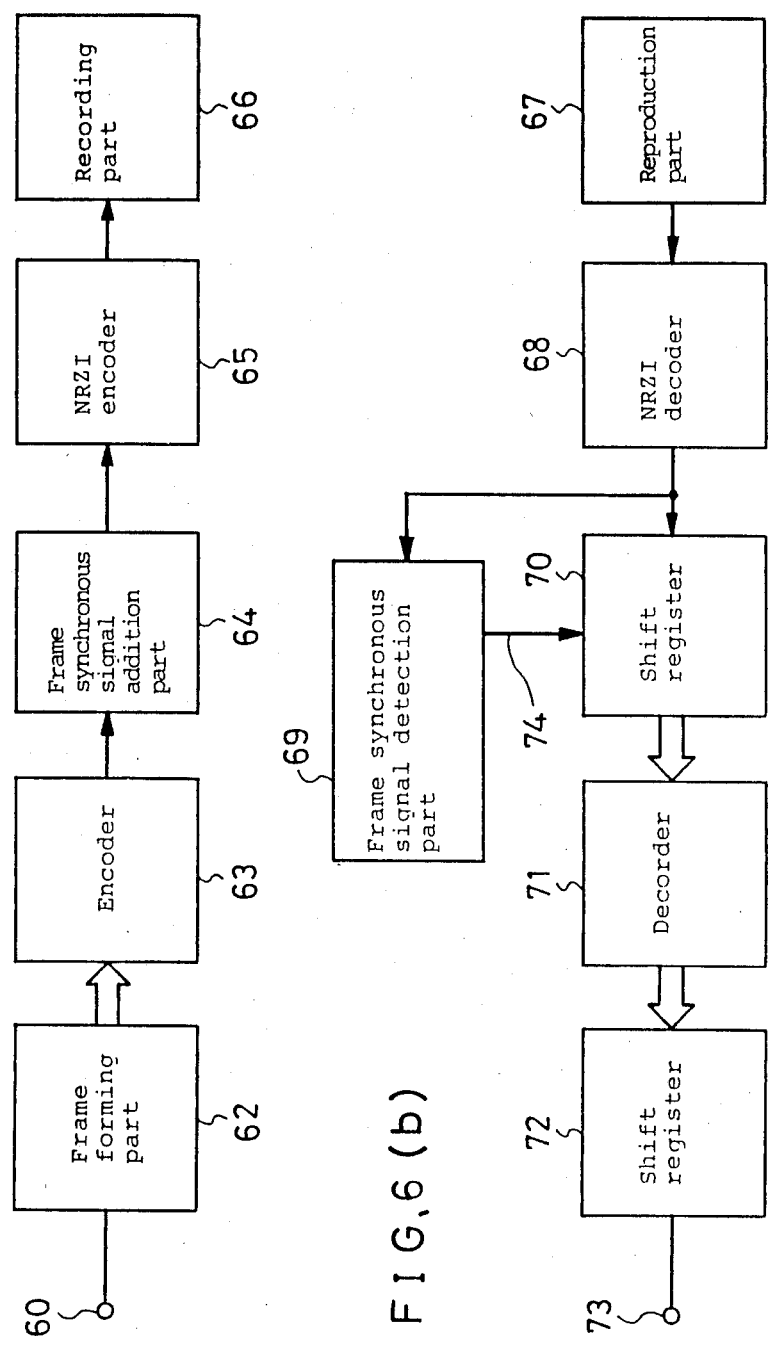
FIG. 6(a) is a block diagram of an encoding and a recording circuit in the embodiment in accordance with the present invention.
FIG. 6(b) is a block diagram of a decoding and reproducing circuit in the embodiment in accordance with the present invention.

As shown in FIG. 6, the shift register 70 divides the reproduced code sequence which is inputted serially into the codes to be applied to the decoder 71. In the decoder 71, the 8-bit digital data corresponding to the inputted code is outputted to the shift register 72. The inputted 8-bit digital data is then outputted serially from the digital data output terminal 73. As mentioned above, the frame synchronizing signal including the 16-bit pattern "1000000010000000" which does not appear in the code sequence, when 8-14 encoding is adopted, is recorded. Hence, the frame synchronizing signal can be detected precisely by a simple circuit.

What is claimed is:

1. A digital data recording and reproducing method, comprising the steps of:
 dividing a string of inputted digital data into successive 8-bit information words;
 assigning to each 8-bit information word at least one 14-bit NRZI code word in which the number of "0" bits inserted between two successive "1" bits in each 14-bit NRZI code word is between one and eight, inclusive;
 determining the digital sum variation of the preceding 14-bit NRZI code words forming an NRZI coded waveform representative of successive 8-bit information words in said string of inputted digital data; and
 selecting one of said assigned 14-bit NRZI code words to represent the next 8-bit information word divided from said string of inputted digital data as a function of the polarity of an NRZI code word digital sum of said selected one 14-bit NRZI code word and the polarity of the determined digital sum variation sum that said selected one 14-bit NRZI code word tends to decrease the absolute value of the digital sum variation of the NRZI coded waveform.

2. A digital data recording and reproducing method in accordance with claim 1, wherein said assigning step comprises the steps of:
calculating the NRZI code word digital sum of respective 14-bit NRZI code words assigned to each of said 8-bit information words;
assigning a 14-bit code in which the calculated code word digital sum is zero to one of said 8-bit information words by one-to-one correspondence; and
assigning a pair of 14-bit codes in which the calculated code word digital sums have different absolute values and are greater than and less than zero, respectively, to another one of said 8-bit information words by one-to-one correspondence.

3. A digital data recording and reproducing method in accordance with claim 2, wherein said selecting step comprises the steps of:
determining whether the calculated code word digital sums are positive or zero when the digital sum variation of the preceding 14-bit NRZI code words is positive and the polarity of the last bit of the immediately preceding 14-bit NRZI code word of said NRZI coded waveform is positive and when the digital sum variation of the preceding 14-bit NRZI code words is negative and the polarity of the last bit of the immediately preceding 14-bit NRZI code word of said NRZI coded waveform is negative; and
determining whether the calculated code word digital sums are negative or zero when the digital sum variation of the preceding 14-bit NRZI code words is positive and the polarity of the last bit of the immediately preceding 14-bit NRZI code word of said NRZI coded waveform is negative and when the digital sum variation of the preceding 14-bit NRZI code words is negative and the polarity of the last bit of the immediately preceding 14-bit NRZI code word of said NRZI coded waveform is positive.

4. An apparatus for recording and reproducing digital data, comprising:
means for dividing a string of inputted digital data into successive 8-bit information words;
means for assigning to each successive 8-bit information word at least one 14-bit NRZI code word in which the number of "0" bits inserted between two successive "1" bits in each 14-bit code word is between one and eight, inclusive;
means for issuing a control signal for selecting one of said assigned 14-bit NRZI code words assigned to said 8-bit information words as a function of the polarity of an NRZI code word digital sum of said assigned 14-bit NRZI code words and the polarity of the digital sum variation of the preceding 14-bit NRZI code words forming an NRZI coded waveform representative of successive 8-bit information words in said string of inputted digital data such that said selected one 14-bit NRZI code word tends to decrease the absolute value of the digital sum variation of the NRZI coded waveform; and
means responsive to said control signal for selecting said one assigned 14-bit NRZI code word to represent an inputted 8-bit information word divided from said string of inputted digital data.

5. An apparatus for recording and reproducing digital data in accordance with claim 4, wherein said control signal issuing means comprises:
means for calculating a variation of the digital sum variation of the preceding 14-bit NRZI code words which will be caused by said selected one 14-bit NRZI code word;
means for adding said variation of the digital sum variation to the digital sum variation of the preceding 14-bit NRZI code words;
means for storing the sum outputted by said adding means; and
means for discriminating an updated value of the digital sum variation as the sum from said adding means stored in said storing means.

6. An apparatus for recording and reproducing digital data in accordance with claim 4, wherein said control signal issuing means comprises:
means for determining whether the code word digital sum of said selected one 14-bit NRZI code word is positive or zero when the digital sum variation of the preceding 14-bit NRZI code words and the last bit of the immediately preceding 14-bit NRZI code word of said NRZI coded waveform have the same non-zero polarity and for determining whether the code word digital sum of said selected one 14-bit NRZI code word is negative or zero when the digital sum variation of the preceding 14-bit NRZI code words and the last bit of the immediately preceding 14-bit NRZI code word of said NRZI coded waveform have different non-zero polarities.

7. An apparatus for recording and reproducing digital data in accordance with claim 4, further comprising means for adding a frame synchronizing signal at predetermined intervals to the NRZI coded waveform comprised of successive 14-bit NRZI code words, said frame synchronizing signal being a bit sequence which never occurs in two successive 14-bit NRZI code words.

8. An apparatus for recording and reproducing digital data in accordance with claim 7, wherein said frame synchronizing signal is an N-bit sequence ($N \geq 16$) including a pattern "10000000010000000" which does not coincide with any continuous 16-bit code sequence formed by any successive 14-bit NRZI code words in said NRZI coded waveform.

* * * * *